United States Patent
Schmit et al.

(10) Patent No.: US 8,184,704 B2
(45) Date of Patent: May 22, 2012

(54) SPATIAL FILTERING OF DIFFERENTIAL MOTION VECTORS

(75) Inventors: Michael L. Schmit, Cupertino, CA (US); Radha Giduthuri, Campbell, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1202 days.

(21) Appl. No.: 11/951,222

(22) Filed: Dec. 5, 2007

(65) Prior Publication Data
US 2009/0147852 A1 Jun. 11, 2009

(51) Int. Cl.
*H04N 7/12* (2006.01)
*H04N 11/04* (2006.01)
*H04N 11/02* (2006.01)

(52) U.S. Cl. .............................. 375/240.16; 375/240.24

(58) Field of Classification Search .................... None
See application file for complete search history.

(56) References Cited

U.S. PATENT DOCUMENTS

| | | | |
|---|---|---|---|
| 7,346,109 B2 * | 3/2008 | Nair et al. ................. | 375/240.16 |
| 2006/0222074 A1 * | 10/2006 | Zhang ....................... | 375/240.16 |
| 2007/0127573 A1 * | 6/2007 | Soroushian et al. ...... | 375/240.16 |
| 2008/0025395 A1 * | 1/2008 | Nemiroff et al. ......... | 375/240.12 |
| 2008/0212676 A1 * | 9/2008 | Liu et al. ................. | 375/240.16 |

* cited by examiner

Primary Examiner — Marcus R Smith
(74) Attorney, Agent, or Firm — Volpe and Koenig, P.C.

(57) ABSTRACT

Embodiments include a video data encoding method comprising receiving video input frames, and performing motion estimation on the video received frames. The motion estimation comprises performing a hierarchical motion search to find motion vectors with optimum sum of absolute difference (SAD) values, and performing spatial filtering of the motion vectors, wherein spatial filtering comprises making some pairs of motion vectors the same to achieve a zero differential.

21 Claims, 13 Drawing Sheets

SPATIAL FILTERING OF DIFFERENTIAL MOTION VECTORS

TECHNICAL FIELD

The invention is in the field of encoding video data.

BACKGROUND

Video encoders are designed to output a stream of information that is compliant with a particular video compression standard (such as VC-1, H.264, MPEG-2, and others). The way in which the out put stream is produced is not dictated by any standard. Therefore, video encoders have been continually refined to produce high quality results with low overhead (for example, low bit-rate) within the constraints imposed available by hardware and software tools. Conventional video encoders perform motion estimation by searching each macroblock in a frame, determining its motion vector, cost in bits, etc., performing a subtraction, and getting a residual. A macroblock is typically 16×16 pixels. The residual is what is encoded to represent the image. Typical video encoders are slow when they produce very high quality video. One of the reasons for this is that many brute force computations are performed, attempting many solutions and picking the best one. It is desirable to have a video encoding method that is optimized to reduce the complexity of computations cycles while still attaining very high quality video.

The drawings represent aspects of various embodiments for the purpose of disclosing the invention as claimed, but are not intended to be limiting in any way.

DETAILED DESCRIPTION

Embodiments of a method and system for video encoding include a method that takes advantage of massively parallel computing available in graphics processing units. The design of the video codecs is based on the statistical fact that most pixels in a sequence of video frames do not change by a significant amount. Or when they do change they are still similar to their neighbor pixels either spatially or temporally. The use of motion vectors takes advantage of temporal similarity. Differentially encoding the motion vectors takes advantage of spatial similarity, that is, one block of pixels in a frame tends to have the same motion as its neighbors. Codecs such as MPEG-2 and H.264 take advantage of the spatial similarity of motion vectors by utilizing differential encoding. Embodiments described herein perform filtering and analysis of the proposed neighboring motion vectors. What this does is attempt to make two vectors the same, even if the "best" proposed vectors were not the same. This helps to improve video quality and/or lower the bit-rate (for example, the differential becomes zero, which requires no bits to encode). In some percentage of cases the bits saved by making the vectors the same can be more than the bits lost by having a slightly greater residual data to compress.

This type of filtering is very well suited to GPU processing where all the blocks are considered and compared in parallel in the GPU shader model of computing rather than the sequential block processing done on a CPU. However, the concept is applicable for CPUs, GPUs and dedicated hardware encoders.

The specific filtering used varies based on the codec in question because they each have a different method for choosing the neighbor that the differential encoding is performed on.

An embodiment of the method finds motion vector for best sum of absolute differences (SAD) using a hierarchical motion search. Spatial filtering is then performed on the motion vectors for improved compression without compromising overall video quality at a given bit-rate. The spatial filtering involves iteratively performing data parallel algorithms, which are well suited for GPUs. In motion estimation of an embodiment, two adjacent motion vectors are made to be the same if the change in SAD is less than a threshold. Also, a motion vector is distorted toward an adjacent motion vector such that the change in SAD is less than a threshold. Once a search over all of the macroblocks in a frame is complete, multiple iterative passes are executed to refine the vectors. For each set of macroblocks compared, it is determined how the video quality is changed. If the quality loss is acceptable, the differential is made to be zero. Zero differential requires no bits to encode, and so is very economical. The methods described herein could be performed on a highly parallelized GPU, but could also be performed on a CPU, or on a combination of GPU(s) and CPU(s) in a distributed manner.

Figure 1:
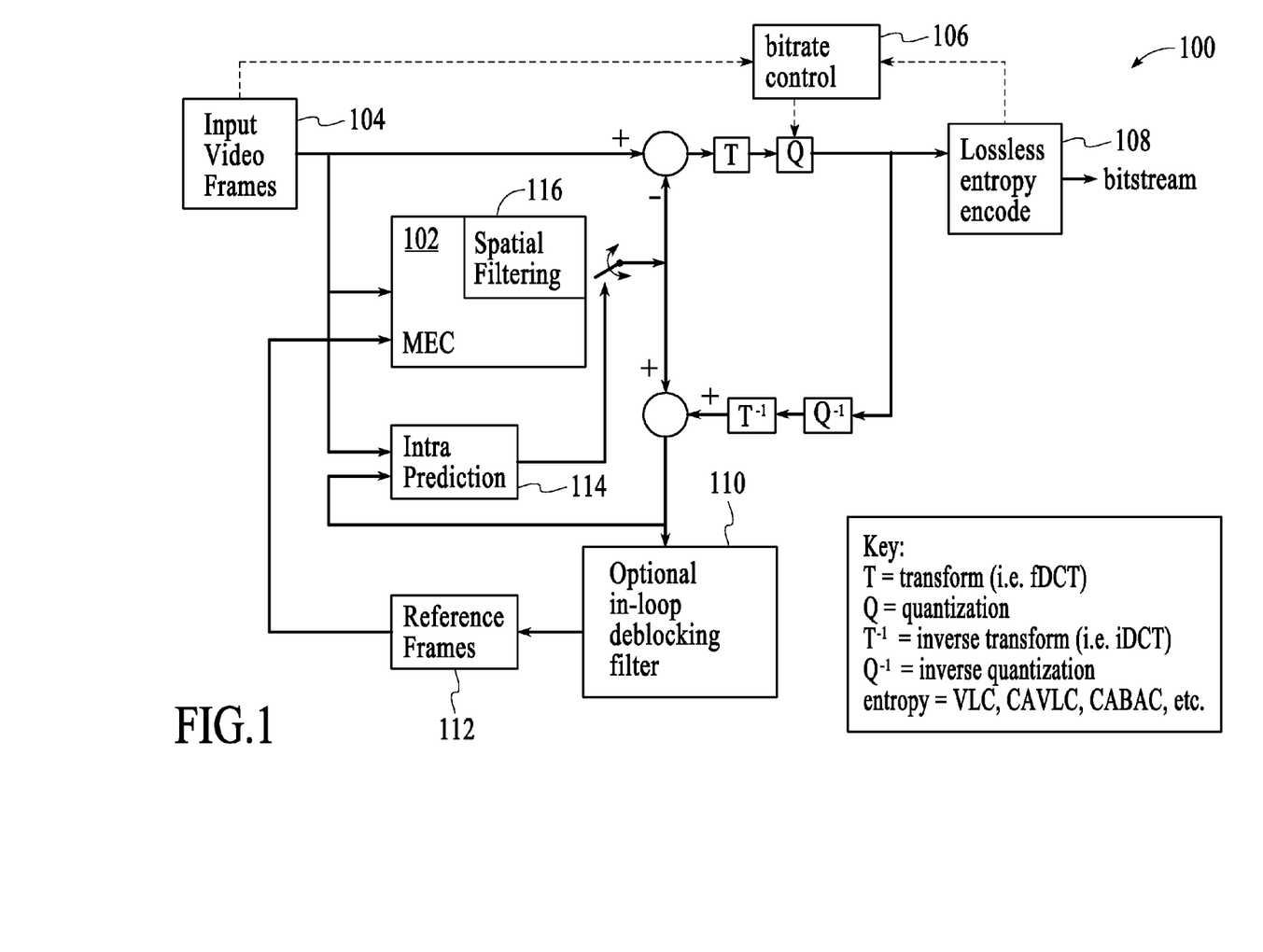
FIG. 1 is a block diagram of a video encoder pipeline according to an embodiment.

FIG. 1 is a block diagram of a video encoder pipeline 100 according to an embodiment. Video input frames 104 are received by a motion estimation module 102 and an intraprediction module 114. The motion estimation module 102 includes a spatial filtering module 116 as further described herein. In general, blocks of the video encoder pipeline 100, with the exception of the motion estimation module 102 and spatial filtering module 114, are known in the art. The video encoder pipeline 100 further includes an optional in-loop de-blocking filter 110 that outputs reference frames 112. A lossless entropy encode module 108 outputs a compliant video bitstream, and a bit-rate control module 106 provides feed back to the input video frames 104.

Figure 2:
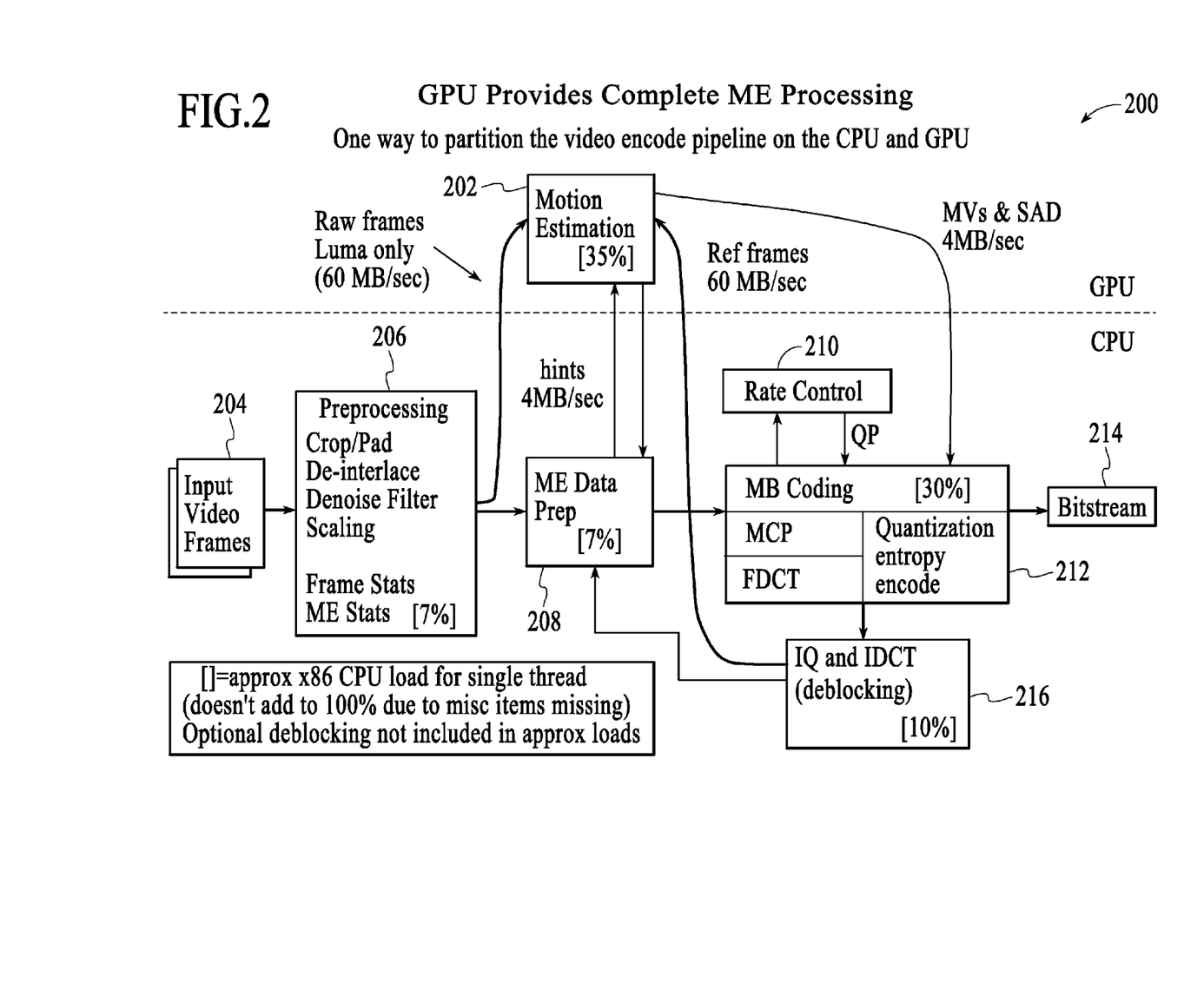
FIG. 2 is a block diagram of a system according to an embodiment in which a GPU provides complete motion estimation processing.

FIG. 2 is a block diagram of a system 200 according to an embodiment in which a GPU provides complete motion estimation processing. Video input frames 204 are input to preprocessing module 206, which outputs data to a motion estimation data prep module 208 and to a motion estimation module 202. The system 200 further includes a rate control module 210, IQ and IDCT deblocking module 216, and MB coding/MCP/FDCT/Quantization-entropy-encode module 212, which outputs bitstream 214. The various percentages of the processing load assumed by each module are shown. As shown, motion estimation in this example accounts for approximately 35% of the processing load in such an embodiment. In other systems, a designer could choose to adjust this percentage, for example to 50% or even 90%.

Figure 3:
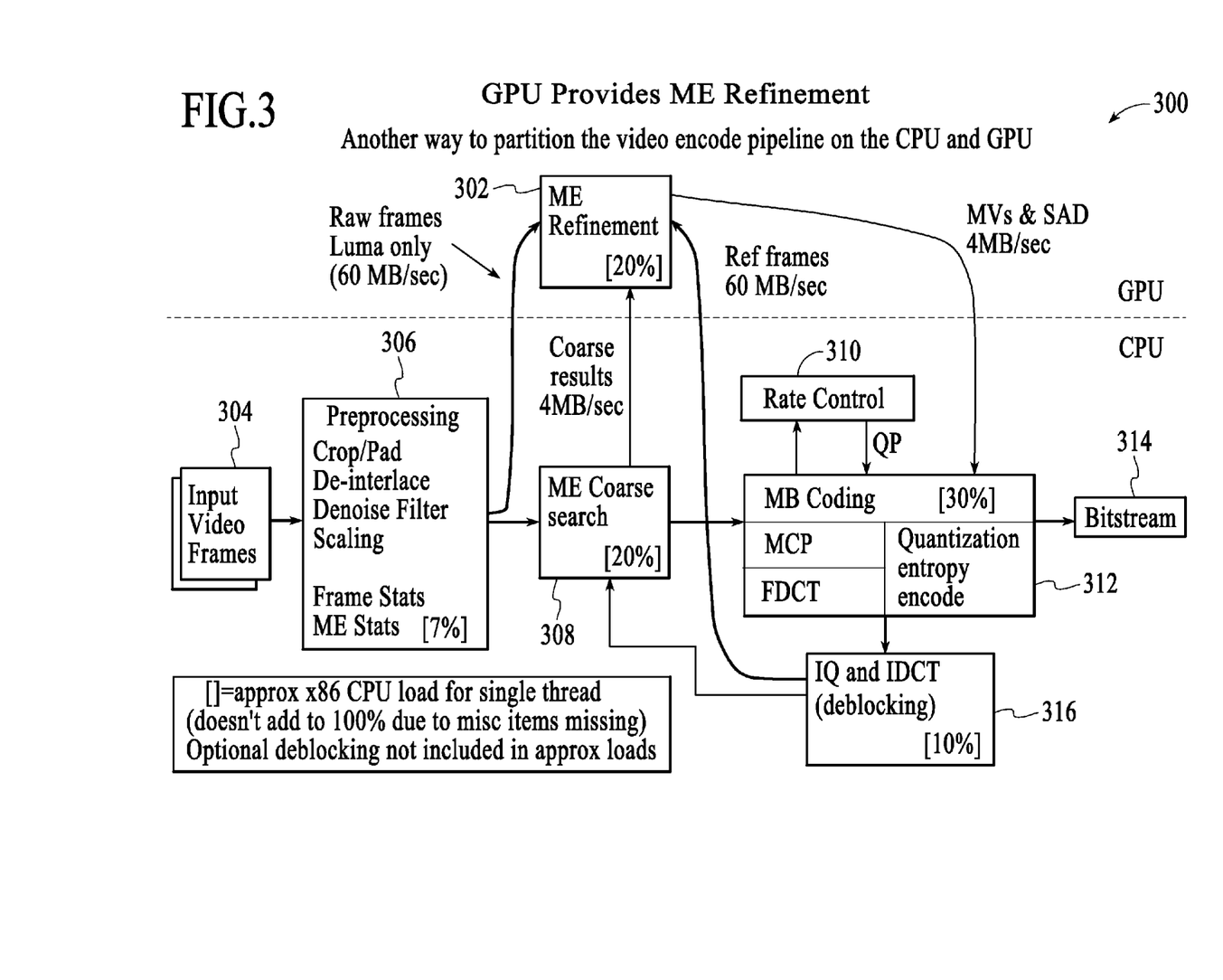
FIG. 3 is a block diagram of a system according to an embodiment that partitions the video encoding pipeline in a different way from the system of FIG. 2.

FIG. 3 is a block diagram of a system 300 according to an embodiment that partitions the video encoding pipeline in a different way from system 200. Video input frames 304 are input to preprocessing module 306, which outputs data to a motion estimation coarse search module 308 and to a motion estimation module 302. The system 300 further include a rate control module 310, IQ and IDCT deblocking module 314, and MB coding/MCP/FDCT/Quantization-entropy-encode module 312, which outputs bitstream 314. The various percentages of the processing load assumed by each module are shown. As shown, motion estimation accounts for approximately 20% of the processing load in such an embodiment.

Figure 4:
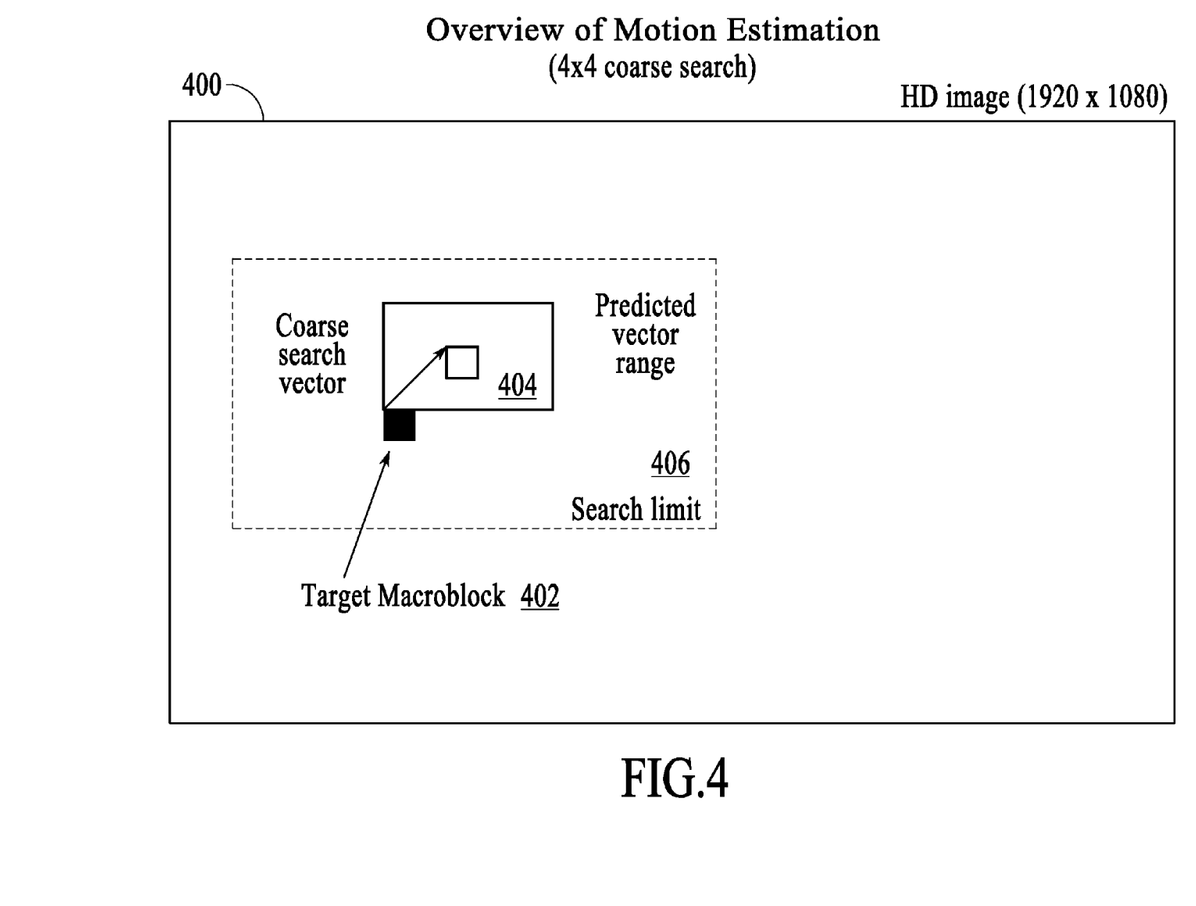
FIG. 4 is a block diagram illustrating an overview of motion estimation according to an embodiment that uses a 4×4 coarse search in a high-definition image (1920×1080).

FIG. 4 is a block diagram illustrating an overview 400 of motion estimation according to an embodiment that uses a 4×4 coarse search in a high-definition image (1920×1080). Within a predicted vector range 404 and within a search limit 406, in a target macroblock 402, a coarse search vector is generated.

FIGS. 5 and 6 illustrate examples of two methods for performing full pixel and half pixel refinement, respectively, in a motion search. These are only examples, and there are many other possible outcomes and an even greater number of possible paths to those outcomes.

Methods such as these are used instead of performing an exhaustive search over the entire desired range in order to obtain a near-minimum SAD rather than the absolute minimum SAD as a tradeoff of performing, perhaps only 18%-22% of the full number of comparisons.

Figure 5A:
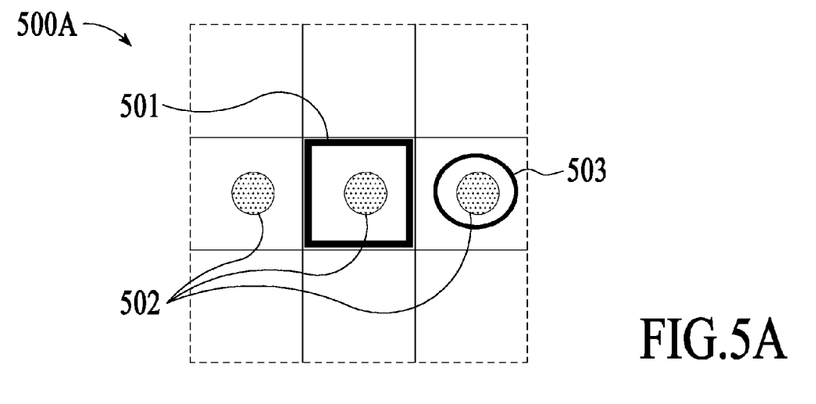
FIG. 5A is a block diagram illustrating an overview 500A of a first step of motion estimation refinement according to an embodiment.

FIG. 5A is a block diagram illustrating an overview 500A of a first step of motion estimation refinement according to an embodiment. A square 501 represents the upper left corner of the 16×16 macroblock of the proposed vector calculated in the coarse search phase. Shaded dots 502 represent step 1 samples, e.g., one pixel to the left and one to the right plus the current proposed vector. A circle 503 is, for this example, the pixel for the macroblock that has the minimum SAD of the 3 choices, so the proposed best vector is adjusted to the circled position which is +1 pixel to the right and the same vertically as the original vector.

Figure 5B:
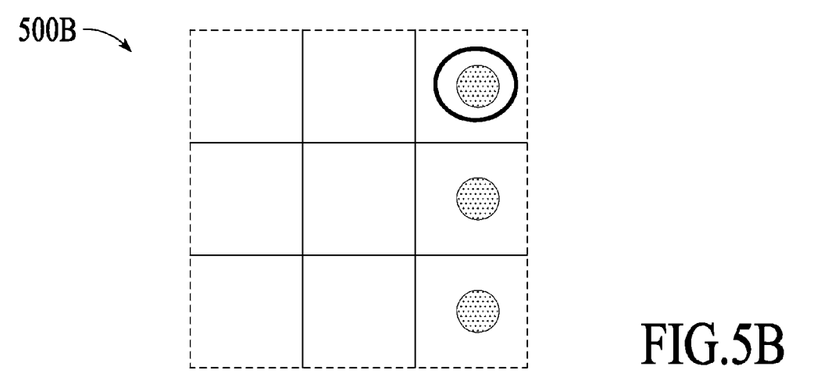
FIG. 5B is a block diagram illustrating an overview 500B of a second step of motion estimation refinement according to an embodiment.

FIG. 5B is a block diagram illustrating an overview 500B of a second step of motion estimation refinement according to an embodiment. This repeats the step 1 algorithm, but in the vertical direction. In this example case the upper choice has the minimum SAD, representing a motion vector that is +1 pixel to the right and +1 pixel above the original.

Figure 5C:
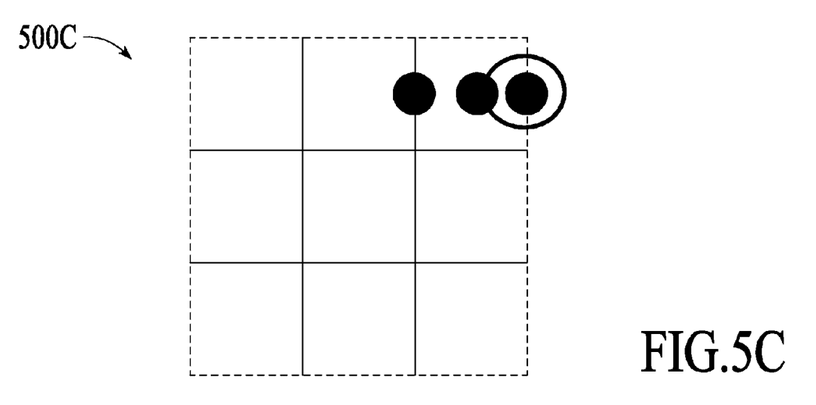
FIG. 5C is a block diagram illustrating an overview 500C of a third step of motion estimation refinement according to an embodiment.

FIG. 5C is a block diagram illustrating an overview 500C of a third step of motion estimation refinement according to an embodiment. This repeats the algorithms, but this time in the horizontal direction and using half-pixel increments. In this example case the right-most choice has the minimum SAD representing a motion vector that is +1.5 pixels to the right and +1 pixels above the original.

Figure 5D:
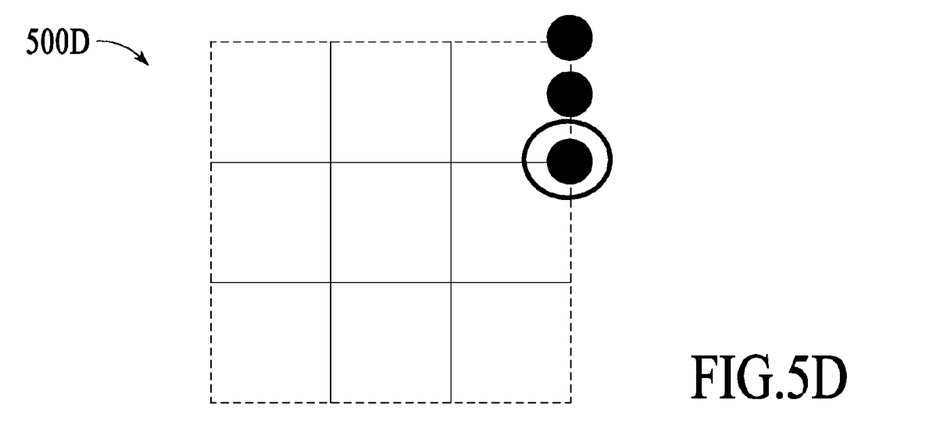
FIG. 5D is a block diagram illustrating an overview 500D of a fourth step of motion estimation refinement according to an embodiment.

FIG. 5D is a block diagram illustrating an overview 500D of a fourth step of motion estimation refinement according to an embodiment. The half pixel search continues in the vertical direction. In this case the final motion vector with lowest SAD is found at +1.5 pixels to the right and +0.5 pixels above the original vector. In these four steps SAD values of nine total macroblock positions five full pixel plus four half pixel) have been compared out of the 49 possible positions within the plus or minus 1.5 pixel range.

Figure 5E:
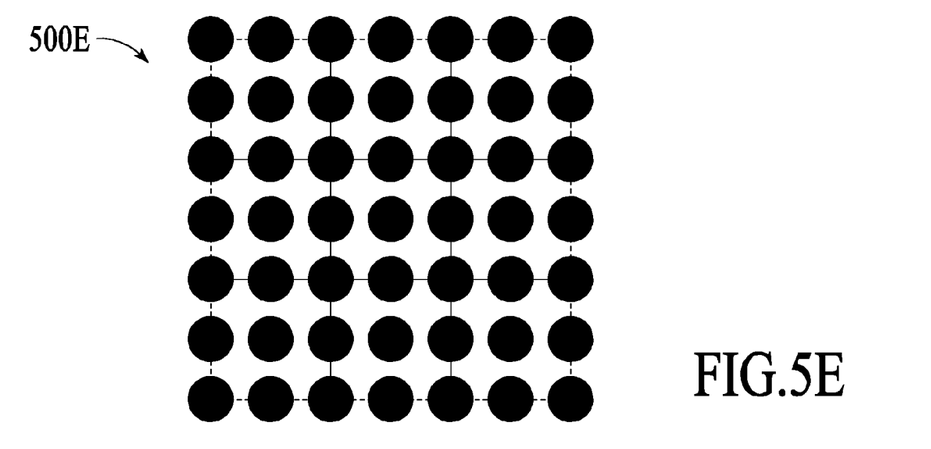
FIG. 5E is a block diagram illustrating an overview 500E of a possible range covered according to the embodiment of FIGS. 5A-5D.

FIG. 5E is a block diagram illustrating an overview 500E of a possible range covered according to the embodiment of FIGS. 5A-5D.

Figure 6A:
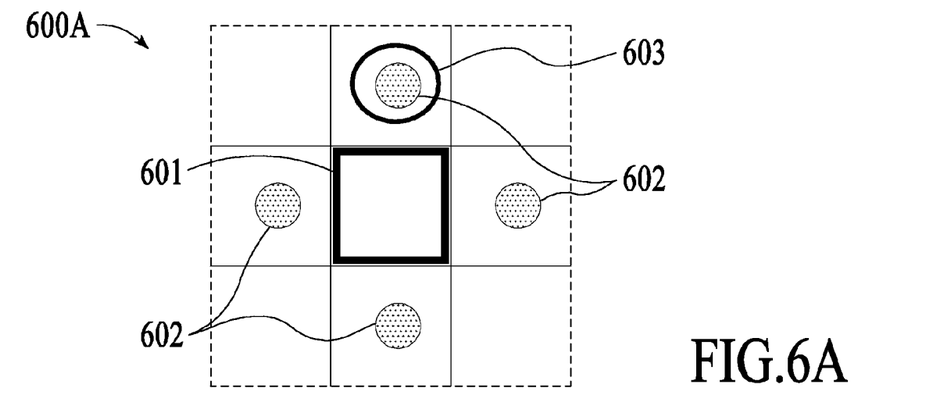
FIG. 6A is a block diagram illustrating an overview 600A of a first step of motion estimation refinement according to an embodiment.
Figure 6B:
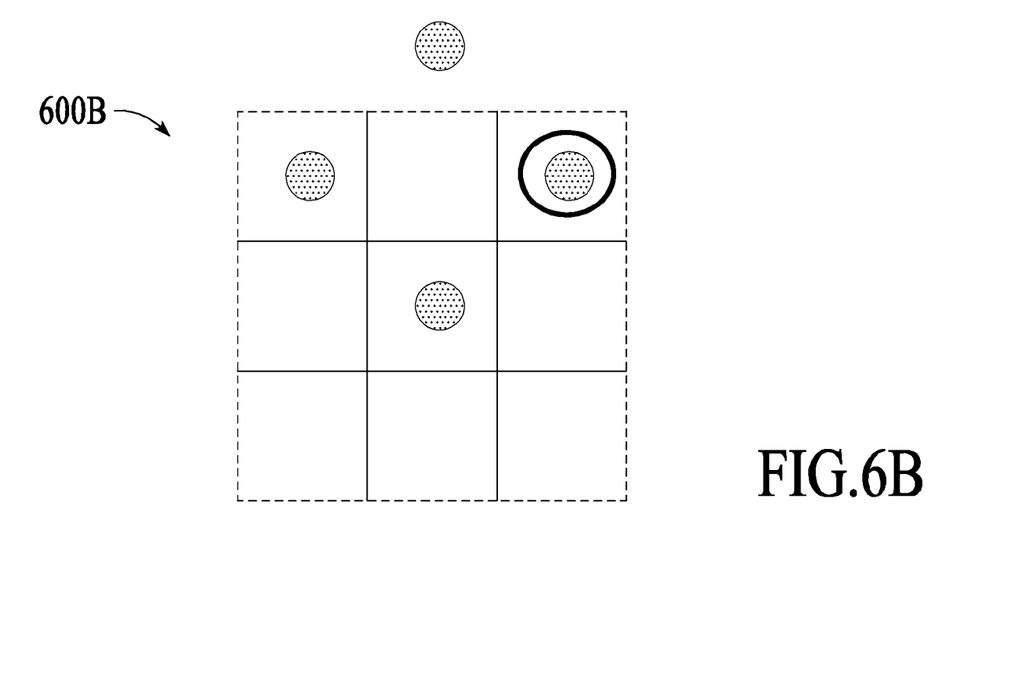
FIG. 6B is a block diagram illustrating an overview 600B of a second step of motion estimation refinement according to an embodiment.
Figure 6C:
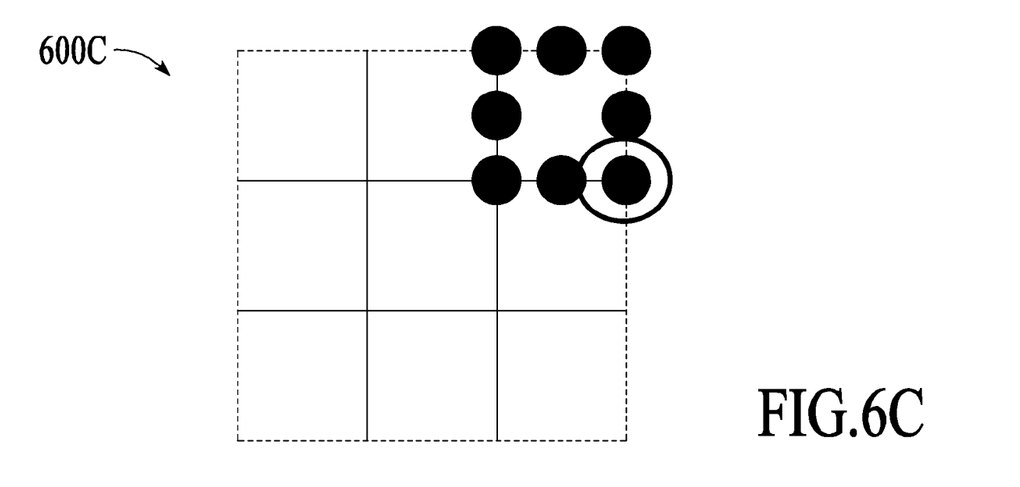
FIG. 6C is a block diagram illustrating an overview 600C of a third step of motion estimation refinement according to an embodiment.

FIGS. 6A-6C illustrate an alternate method of motion vector refinement. FIG. 6A is a block diagram illustrating an overview 600A of a first step of motion estimation refinement according to this alternate embodiment. This alternate method of motion estimation refinement starts with the same proposed center. A square 601 represents the upper left corner of the 16×16 macroblock of the proposed vector calculated in the coarse search phase. The SADs for the four surrounding positions are computed, where each dot 602 represents the upper left corner of a 16×16 macroblock. In this case the minimum is found at the circled position 603 of no change in the horizontal position and +1 above. This 4-way search, compared to the initial vector is called a diamond search (due to the visual shape). This is well suited for GPUs since groups of four are optimized on GPUs.

FIG. 6B is a block diagram illustrating an overview 600B of a second step of motion estimation refinement according to an embodiment. The second step repeats the first step, identically, starting based on the result of the first step (comparison of the original center location is not actually required, since it was already determined to have a higher SAD). Note that if the minimum SAD in the step 1 resulted in no change to the motion vector, then this step is skipped. In this example the right hand choice has the minimum SAD. This is +1 to the right and +1 above the original vector. Note that this step may be repeated numerous times to extend the overall range of the search.

FIG. 6C is a block diagram illustrating an overview 600C of a third step of motion estimation refinement according to an embodiment. This is the final step on the half-pixel boundaries. All eight possible half pixel choices surrounding the proposed vector have the SAD calculated and the minimum SAD, in this case, is found at +1.5 pixels to the right and +0.5 pixels above the original vector. In this algorithm, 8 full pixel and 8 half-pixel locations are compared. This covers the same 49 positions as the previous method plus an additional 24 locations.

Figure 6D:
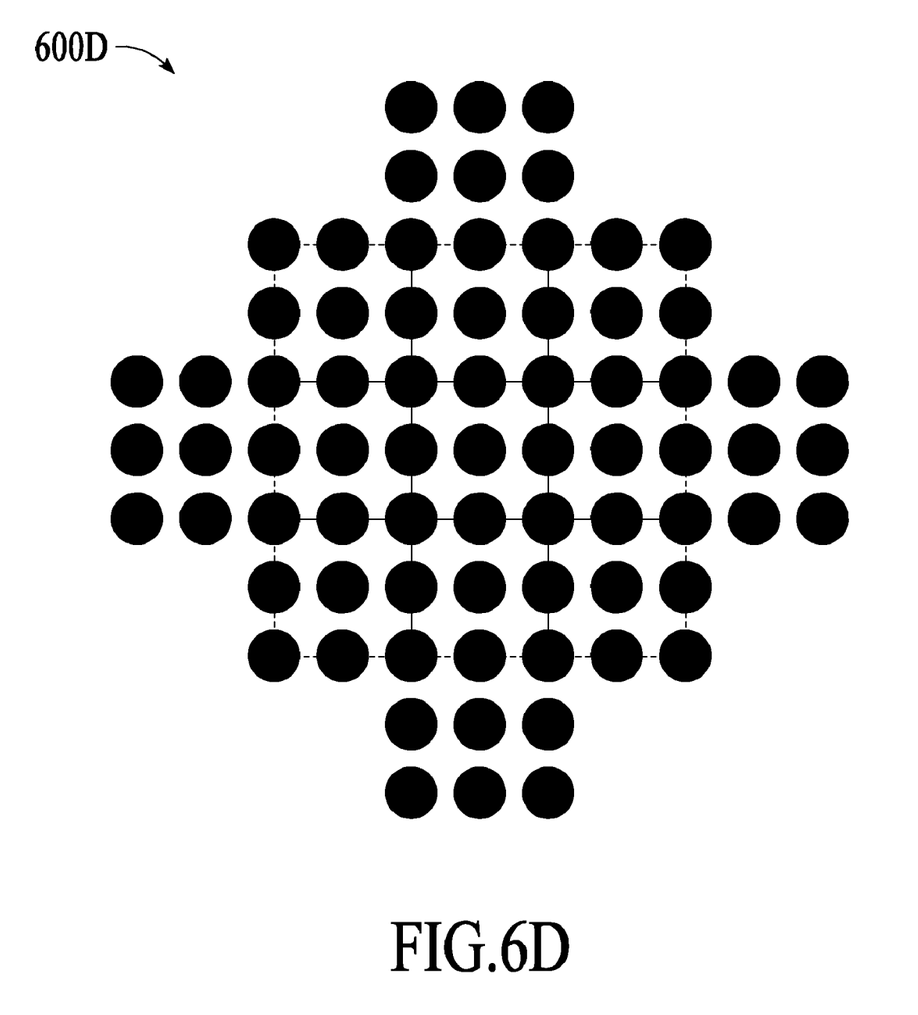
FIG. 6D is a block diagram illustrating an overview 600D of a possible range covered according to the embodiment of FIGS. 6A-6C.

FIG. 6D is a block diagram illustrating an overview 600D of a possible range covered according to the embodiment of FIGS. 6A-6C.

Figure 7:
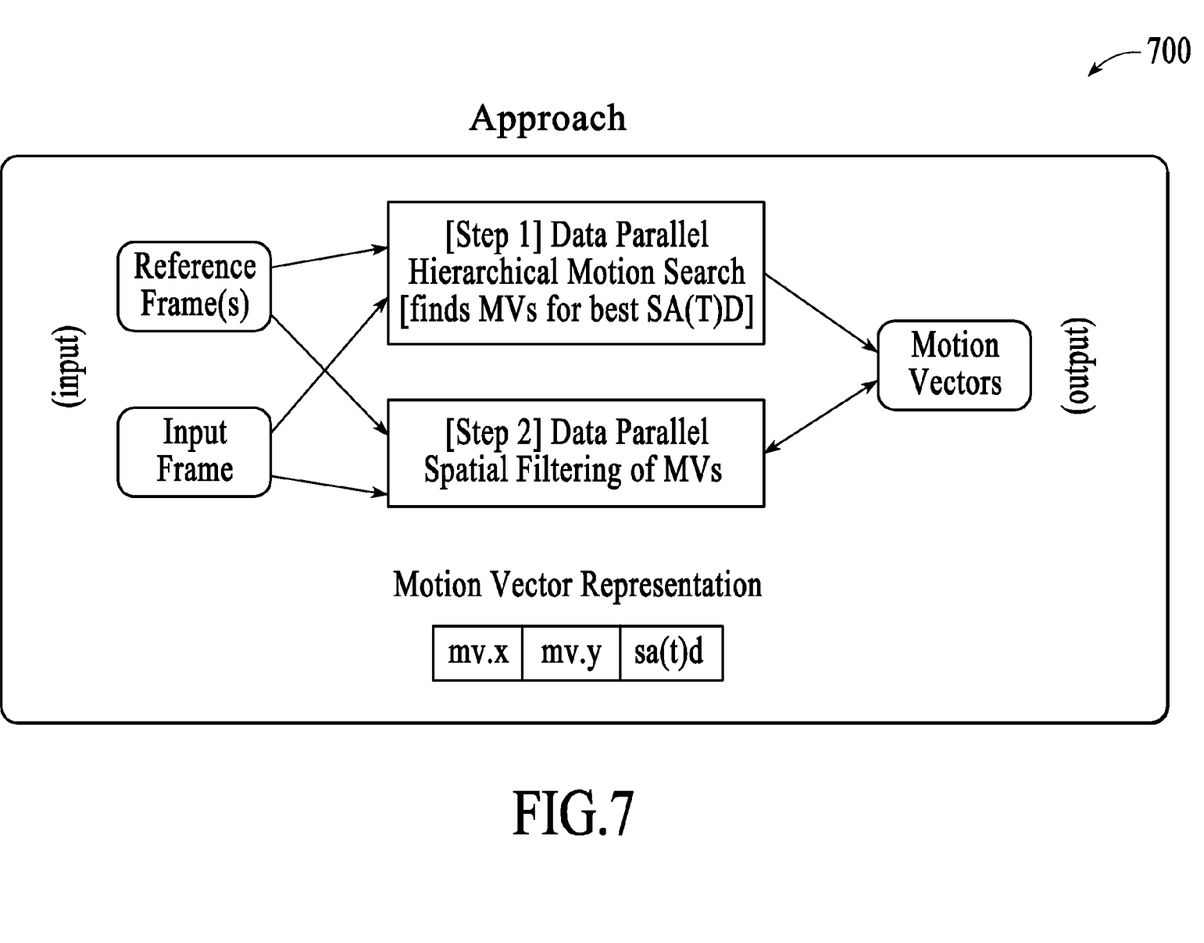
FIG. 7 is a block diagram illustrating motion estimation with spatial filtering according to an embodiment.

FIG. 7 is a block diagram illustrating motion estimation with spatial filtering according to an embodiment. In summary, the approach illustrated finds the motion vectors for the best SA(T)D using hierarchical motion search. The approach performs spatial filtering on motion vectors for better compression without comprising overall video quality at a given bit-rate. Iterative data parallel algorithms are used. These algorithms are well suited to GPUs but can be executed on other processors. Reference video frames and input video frames are input into two operations. One operation is a data parallel hierarchical motion search to find the best motion vector for optimum sum of absolute transformed difference (SATD). The SATD can be Hadamard, but embodiments are not so limited. Other block matching quality metrics include SAD, and sum of squared differences (SSD). The other operation is data parallel spatial filtering of motion vectors.

In various embodiments, motion vector spatial filtering varies with the motion vector compression technique. Examples include: MPEG-2, which predicts motion vectors from the left macroblock; and H.264 and VC-1 which predict motion vectors from the left macroblock and neighbor macroblocks from above the macroblock row. Other existing or new compression standards may use different motion vector prediction techniques and all are within the scope of the embodiments described.

Figure 8:
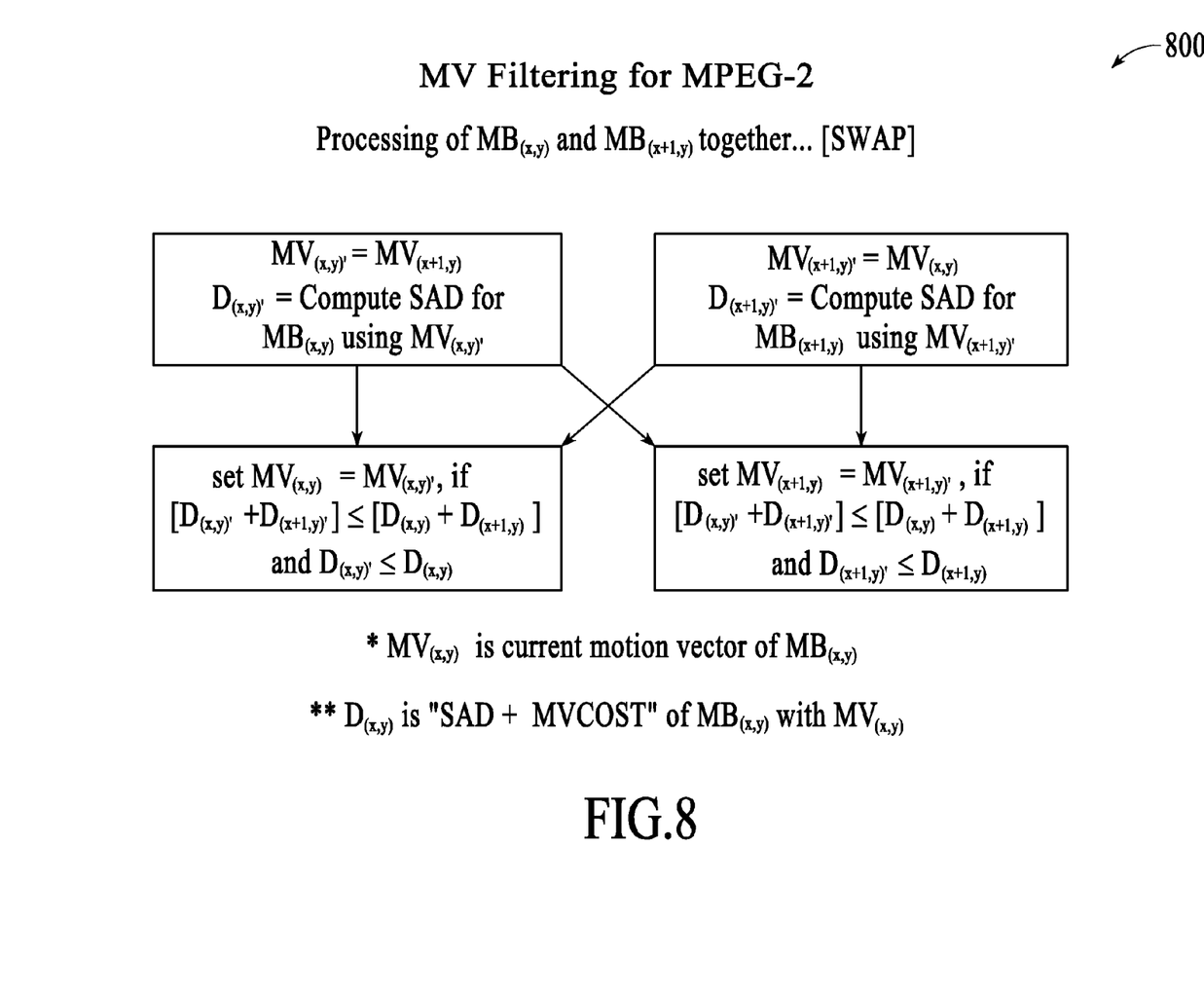
FIG. 8 is a block diagram illustrating motion vector spatial filtering for MPEG-2 using swapping.

FIG. 8 is a block diagram illustrating motion vector spatial filtering 800 for MPEG-2 using swapping. MV(x,y) is current motion vector of MB(x,y). D(x,y) is "SAD+MVCOST" of MB(x,y) with MV(x,y).

Where:
MB—Macroblock
MV—Motion Vector
MVCOST—Coding cost function of MV
SAD—block-matching quality metric FIG. 8 shows processing of MB(x,y) and MB(x+1,y) together . . . [SWAP]

Figure 9:
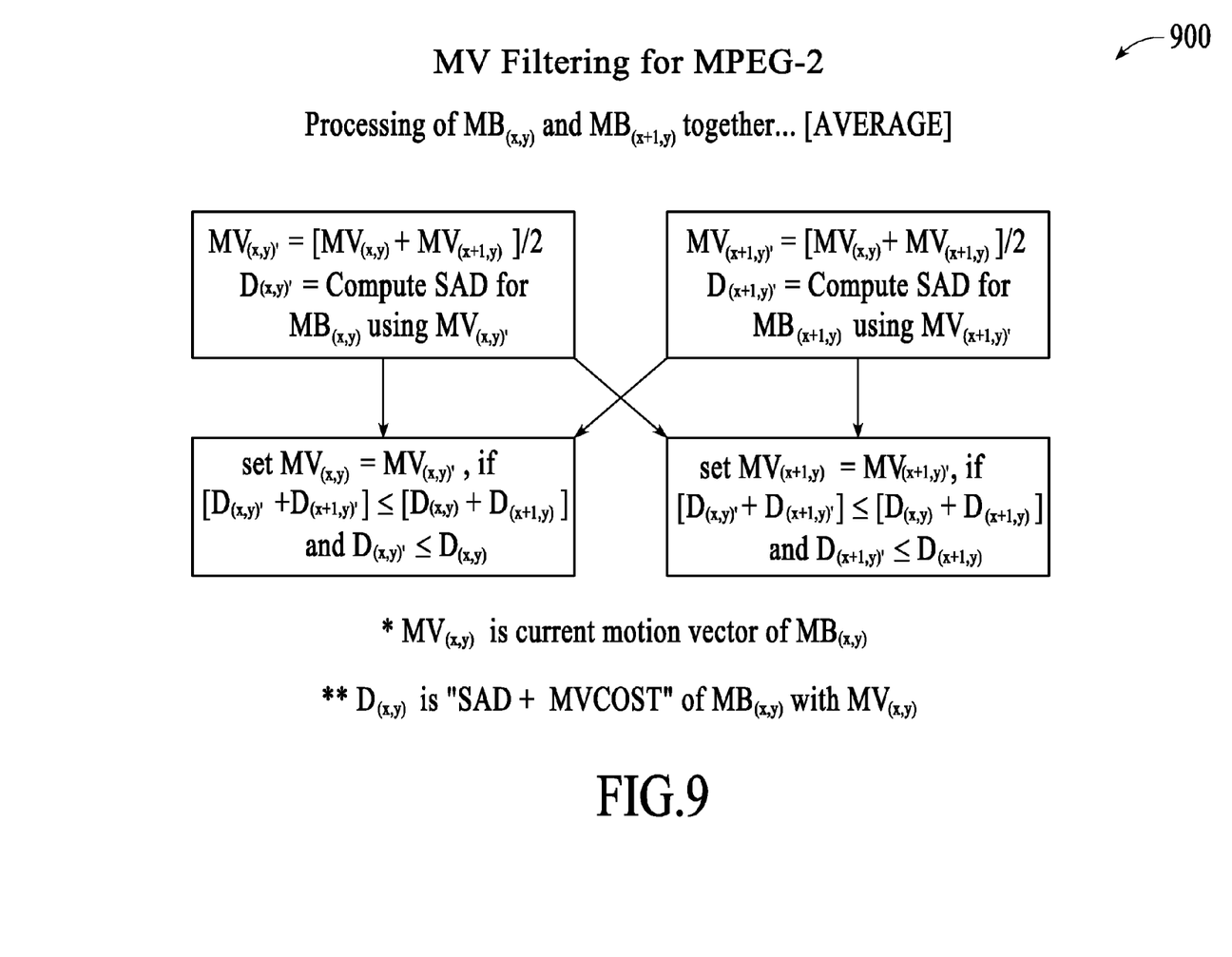
FIG. 9 is a block diagram illustrating motion vector spatial filtering for MPEG-2 using averaging.

FIG. 9 is a block diagram illustrating motion vector spatial filtering 800 for MPEG-2 using averaging. FIG. 9 shows processing of MB(x,y) and MB(x+1,y) together . . . [AVERAGE]

Figure 10:
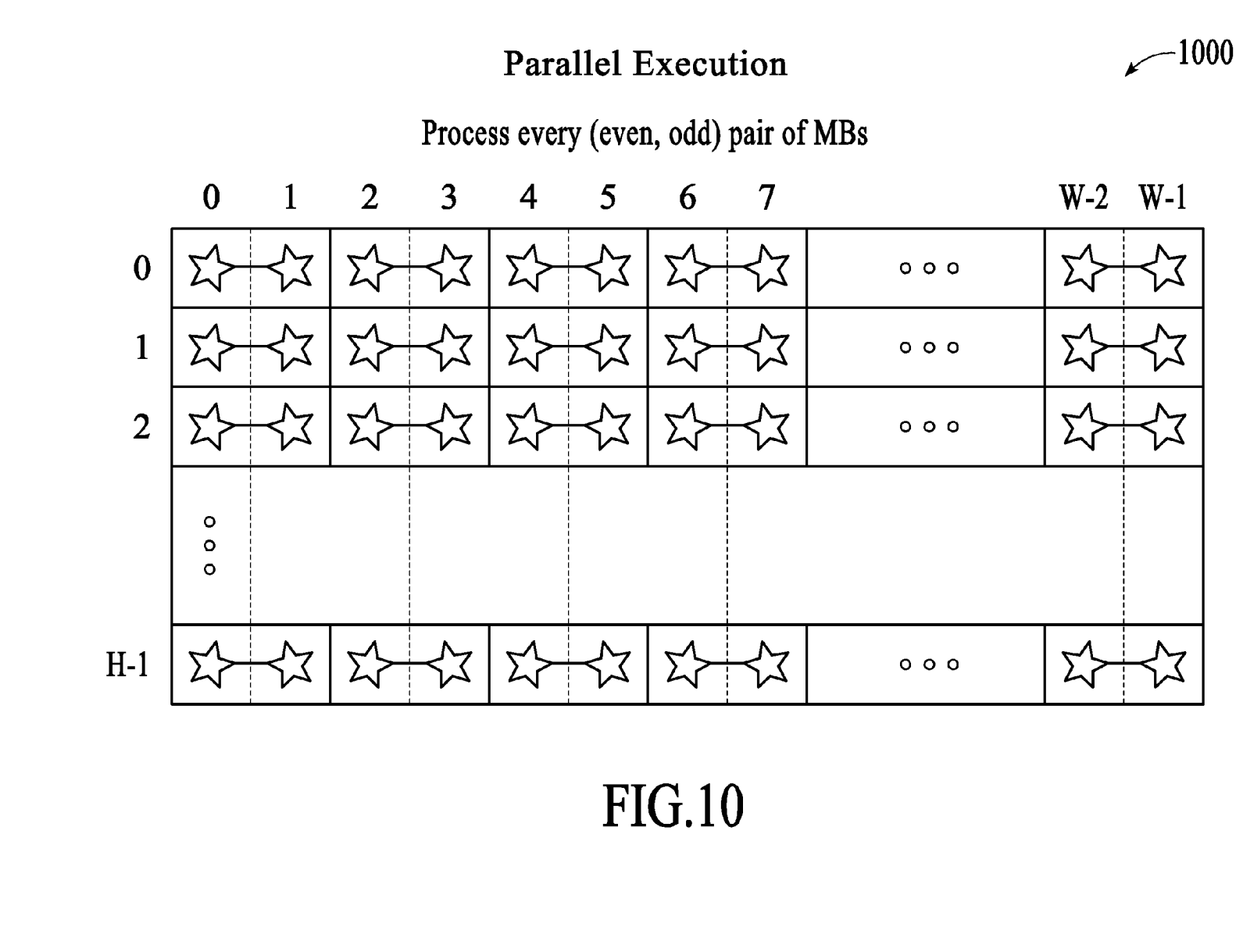
FIG. 10 is a diagram illustrating an embodiment of parallel execution in which every (even, odd) pair of macroblocks is processed.

FIG. 10 is a diagram illustrating an embodiment of parallel execution 1000 in which every (even, odd) pair of macroblocks is processed.

Figure 11:
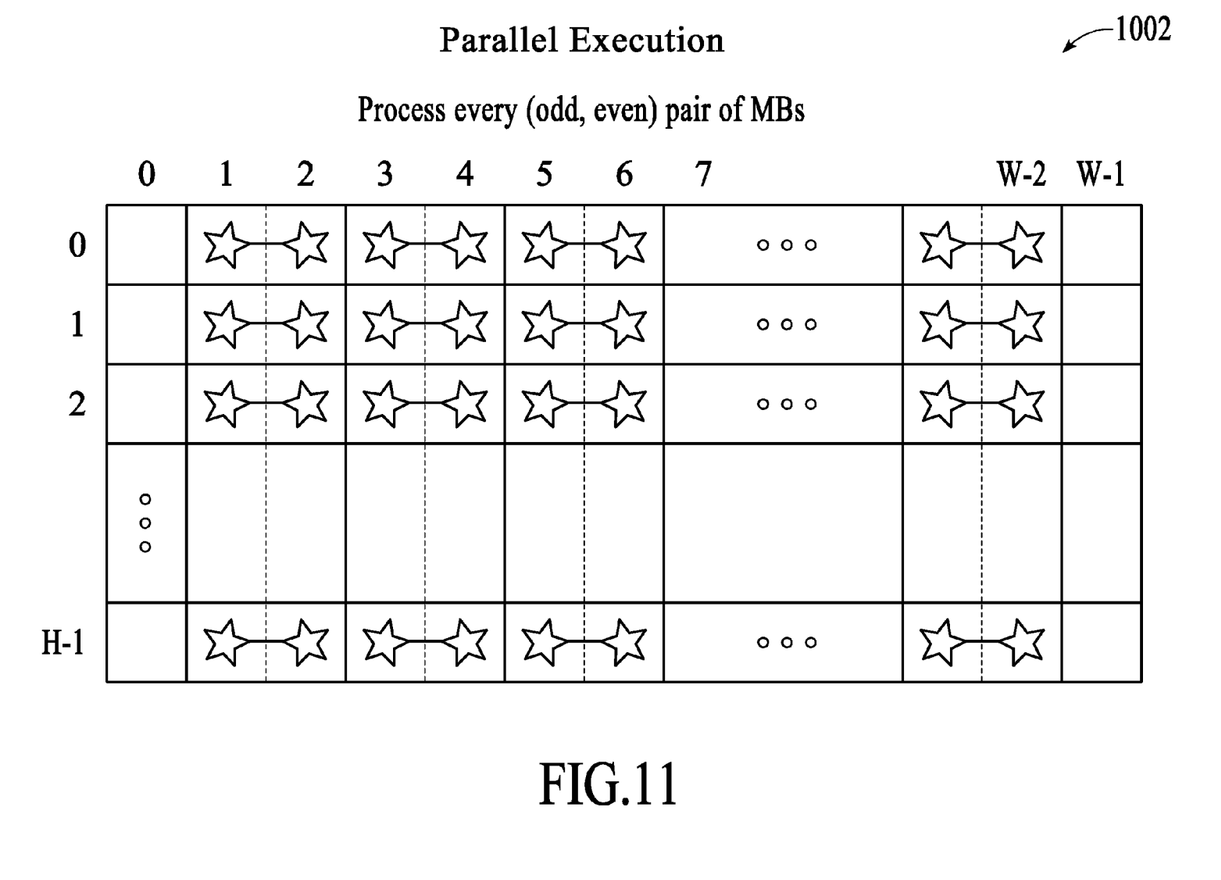
FIG. 11 is a diagram illustrating another embodiment of parallel execution in which every (odd, even) pair of macroblocks is processed.

FIG. 11 is a diagram illustrating another embodiment of parallel execution 1002 in which every (odd, even) pair of macroblocks is processed.

Aspects of the embodiments described above may be implemented as functionality programmed into any of a variety of circuitry, including but not limited to programmable logic devices (PLDs), such as field programmable gate arrays (FPGAs), programmable array logic (PAL) devices, electrically programmable logic and memory devices, and standard cell-based devices, as well as application specific integrated circuits (ASICs) and fully custom integrated circuits. Some other possibilities for implementing aspects of the embodiments include microcontrollers with memory (such as electronically erasable programmable read only memory (EEPROM), Flash memory, etc.), embedded microprocessors, firmware, software, etc. Furthermore, aspects of the embodiments may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies such as complementary metal-oxide semiconductor (CMOS), bipolar technologies such as emitter-coupled logic (ECL), polymer technologies (e.g., silicon-conjugated polymer and metal-conjugated polymer-metal structures), mixed analog and digital, etc.

Embodiments may be implemented in one or more ASICs developed in software (e.g., using a hardware description language (HDL) such as Verilog or the like) and manufactured according to known semiconductor processes. Such HDL code may be stored as computer readable instructions on a computer readable media (e.g., hard drive, flash drive, DVD, etc.).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word, any of the items in the list, all of the items in the list, and any combination of the items in the list.

The above description of illustrated embodiments of the method and system is not intended to be exhaustive or to limit the invention to the precise forms disclosed. While specific embodiments of, and examples for, the method and system are described herein for illustrative purposes, various equivalent modifications are possible within the scope of the invention, as those skilled in the relevant art will recognize. The teachings of the disclosure provided herein can be applied to other systems, not only for systems including graphics processing or video processing, as described above. The various operations described may be performed in a very wide variety of architectures and distributed differently than described. In addition, though many configurations are described herein, none are intended to be limiting or exclusive.

In other embodiments, some or all of the hardware and software capability described herein may exist in a printer, a camera, television, a digital versatile disc (DVD) player, a DVR or PVR, a handheld device, a mobile telephone or some other device. The elements and acts of the various embodiments described above can be combined to provide further embodiments. These and other changes can be made to the method and system in light of the above detailed description.

In general, in the following claims, the terms used should not be construed to limit the method and system to the specific embodiments disclosed in the specification and the claims, but should be construed to include any processing systems and methods that operate under the claims. Accordingly, the method and system is not limited by the disclosure, but instead the scope of the method and system is to be determined entirely by the claims.

While certain aspects of the method and system are presented below in certain claim forms, the inventors contemplate the various aspects of the method and system in any number of claim forms. For example, while only one aspect of the method and system may be recited as embodied in computer-readable medium, other aspects may likewise be embodied in computer-readable medium. Accordingly, the inventors reserve the right to add additional claims after filing the application to pursue such additional claim forms for other aspects of the method and system.

What is claimed is:

1. A video data encoding method, comprising:
 receiving video input frames;
 performing motion estimation on the received video input frames, including:
  performing a hierarchical motion search to find motion vector candidates with a minimum sum of absolute difference (SAD); and
 performing spatial filtering of the motion vector candidates, wherein the spatial filtering includes:
  comparing the SAD of two adjacent motion vector candidates; and
   making the two motion vector candidates the same if the difference in the SAD between the two motion vector candidates is less than a threshold.

2. The method of claim 1, further comprising:
 iteratively performing the spatial filtering; and
 determining a video quality for each iteration.

3. The method of claim 2, wherein the video quality is determined by the SAD and a coding cost function of a motion vector.

4. The method of claim 1, wherein performing the spatial filtering includes:
 computing a value equal to a SAD for a first macroblock plus a coding cost function of a motion vector of an adjacent macroblock; and
 determining whether to set a motion vector of the first macroblock equal to the motion vector of the adjacent macroblock depending on the computed value.

5. The method of claim 1, wherein performing the spatial filtering includes:
 computing a value equal to a SAD for a first macroblock plus a coding cost function of an average of a motion vector of the first macroblock and a motion vector of an adjacent macroblock; and
 determining whether to set the motion vector for the first macroblock equal to the average depending on the computed value.

6. A video data encoding apparatus, comprising:
 an encoder configured to:
  receive an output of a motion estimation module; and
  output a video bitstream in compliance with a predetermined standard;
 the motion estimation module coupled to the encoder and configured to receive input video frames, the motion estimation module including a spatial filtering module, wherein the motion estimation module is configured to perform motion estimation on the input video frames including:
  performing a hierarchical motion search to find motion vector candidates with a minimum sum of absolute difference (SAD); and
  performing spatial filtering of the motion vector candidates, wherein the spatial filtering includes:
   comparing the SAD of two adjacent motion vector candidates; and
    making the two motion vector candidates the same if the difference in the SAD between the two motion vector candidates is less than a threshold.

7. The apparatus of claim 6, wherein the motion estimation module is further configured to:
 iteratively perform the spatial filtering; and
 determine a video quality for each iteration.

8. The apparatus of claim 7, wherein the video quality is determined by the SAD and a coding cost function of a motion vector.

9. The apparatus of claim 6, wherein the spatial filtering performed by the motion estimation apparatus further includes:
 computing a value equal to a SAD for a first macroblock plus a coding cost function of a motion vector of an adjacent macroblock; and
 determining whether to set a motion vector of the first macroblock equal to the motion vector of the adjacent macroblock depending on the computed value.

10. The apparatus of claim 6, wherein the spatial filtering performed by the motion estimation apparatus further includes:
 computing a value equal to a SAD for a first macroblock plus a coding cost function of an average of a motion vector of the first macroblock and a motion vector of an adjacent macroblock; and
 determining whether to set the motion vector for the first macroblock equal to the average depending on the computed value.

11. A system, comprising:
 at least one graphics processing unit (GPU) configured for massively parallel processing;
 at least one central processing unit (CPU) coupled to the GPU;
 at least one encoder configured to:
  receive an output of a motion estimation module; and
  output a video bitstream in compliance with a predetermined standard;
 a motion estimation module coupled to the encoder and configured to receive input video frames, the motion estimation module including a spatial filtering module, wherein the motion estimation module is configured to perform motion estimation processing on the input video frames including:
  performing a hierarchical motion search to find motion vector candidates with a minimum sum of absolute difference (SAD); and
  performing spatial filtering of the motion vector candidates, wherein the spatial filtering includes:
   comparing the SAD of two adjacent motion vector candidates; and
    making the two motion vector candidates the same if the difference in the SAD between the two motion vector candidates is less than a threshold, and
 wherein the motion estimation processing is performed using at least one of the at least one GPU and the at least one CPU.

12. The system of claim 11, wherein the motion estimation module is further configured to:
 iteratively perform the spatial filtering; and
 determine a video quality for each iteration.

13. The system of claim 12, wherein the video quality is determined by the SAD and a coding cost function of a motion vector.

14. The system of claim 11, wherein the spatial filtering performed by the motion estimation module further includes:
 computing a value equal to a SAD for a first macroblock plus a coding cost function of a motion vector of an adjacent macroblock; and
 determining whether to set a motion vector of the first macroblock equal to the motion vector of the adjacent macroblock depending on the computed value.

15. The system of claim 11, wherein the spatial filtering performed by the motion estimation module further includes:

computing a value equal to a SAD for a first macroblock plus a coding cost function of an average of a motion vector of the first macroblock and a motion vector of an adjacent macroblock; and determining whether to set the motion vector for the first macroblock equal to the average depending on the computed value.

16. A non-transitory computer readable medium having stored thereon instructions that, when executed in a system, cause a video data encoding method to be performed, the method comprising:

receiving video input frames;

performing motion estimation on the received video frames, including:

performing a hierarchical motion search to find motion vector candidates with a minimum sum of absolute difference (SAD); and performing spatial filtering of the motion vector candidates, wherein the spatial filtering includes:

comparing the SAD of two adjacent motion vector candidates; and making the two motion vector candidates the same if the difference in the SAD between the two motion vector candidates is less than a threshold.

17. The non-transitory computer readable medium of claim 16, wherein the method further comprises:

iteratively performing the spatial filtering; and determining a video quality for each iteration.

18. The non-transitory computer readable medium of claim 17, wherein the video quality is determined by the SAD and a coding cost function of a motion vector.

19. The non-transitory computer readable medium of claim 16, wherein performing the spatial filtering includes:

computing a value equal to a SAD for a first macroblock plus a coding cost function of a motion vector of an adjacent macroblock; and determining whether to set a motion vector of the first macroblock equal to the motion vector of the adjacent macroblock depending on the computed value.

20. The non-transitory computer readable medium of claim 16, wherein performing the spatial filtering includes:

computing a value equal to a SAD for a first macroblock plus a coding cost function of an average of a motion vector of the first macroblock and a motion vector of an adjacent macroblock; and determining whether to set the motion vector for the first macroblock equal to the average depending on the computed value.

21. The non-transitory computer readable medium of claim 16, wherein the instructions include instructions in a hardware description language.

* * * * *